US012682069B2

(12) United States Patent　　　(10) Patent No.:　US 12,682,069 B2
　　Jia et al.　　　　　　　　　　　　(45) Date of Patent:　　　Jul. 14, 2026

(54) CRITICAL-OBJECT GUIDED OPERATING SYSTEM FUZZING

(71) Applicant: International Business Machines Corporation, Armonk, NY (US)

(72) Inventors: Jinghao Jia, Urbana, IL (US); Michael Vu Le, Danbury, CT (US); Md Salman Ahmed, Danbury, CT (US); Hani Talal Jamjoom, Cos Cob, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/121,650

(22) Filed: Mar. 15, 2023

(65) Prior Publication Data

US 2024/0311491 A1　　Sep. 19, 2024

(51) Int. Cl.
G06F 21/57　　　　(2013.01)
(52) U.S. Cl.
CPC ...... G06F 21/577 (2013.01); G06F 2221/033 (2013.01)
(58) Field of Classification Search
CPC .................. G06F 21/577; G06F 2221/033
See application file for complete search history.

(56) References Cited

U.S. PATENT DOCUMENTS

| | | | | | |
|---|---|---|---|---|---|
| 6,785,810 | B1 * | 8/2004 | Lirov | ...................... | H04L 9/083 |
| | | | | | 707/999.009 |
| 7,594,142 | B1 * | 9/2009 | O'Leary | ............... | G06F 21/577 |
| | | | | | 714/38.11 |
| 8,869,286 | B1 * | 10/2014 | Liu | ...................... | H04L 63/1433 |
| | | | | | 726/25 |
| 9,058,492 | B1 * | 6/2015 | Satish | ...................... | G06F 21/57 |
| 9,176,843 | B1 * | 11/2015 | Ismael | ................... | G06F 21/566 |
| 9,195,809 | B1 * | 11/2015 | Kaplan | ................. | G06F 21/577 |
| 9,306,961 | B1 * | 4/2016 | Jamail | ................. | H04L 63/1416 |
| 9,378,385 | B1 * | 6/2016 | Zhu | ........................ | G06F 21/577 |
| 9,530,007 | B1 * | 12/2016 | Allen | ................... | G06F 11/3688 |
| 9,973,525 | B1 * | 5/2018 | Roturier | .............. | H04L 63/1433 |
| 10,043,013 | B1 * | 8/2018 | Ferrie | ................... | G06F 21/552 |
| 10,135,862 | B1 * | 11/2018 | McClintock | .......... | H04L 63/145 |
| 10,311,229 | B1 * | 6/2019 | Pohlack | .............. | G06F 9/45558 |
| 10,440,050 | B1 * | 10/2019 | Neel | ...................... | H04L 63/145 |
| 10,484,429 | B1 * | 11/2019 | Fawcett | ................. | H04L 63/20 |
| 10,762,199 | B2 * | 9/2020 | Jarrous | .............. | G06F 9/44521 |

(Continued)

FOREIGN PATENT DOCUMENTS

CN　　　　114676051 A　　6/2022

OTHER PUBLICATIONS

Mel, et al. "The NIST Definition of Cloud Computing". Recommendations of the National Institute of Standards and Technology. Nov. 16, 2015.

(Continued)

*Primary Examiner* — Aravind K Moorthy

(74) *Attorney, Agent, or Firm* — Stosch Sabo

(57)　　　　　　ABSTRACT

A critical-object guided operating system fuzzing method, system, and computer program product for guiding an operating system fuzzer to find security-related bugs in a kernel space of the operating system that includes identifying critical/sensitive objects, determining binary code addresses that result in access to the critical/sensitive objects, and executing the operating system fuzzer based on the binary code addresses.

20 Claims, 3 Drawing Sheets

(56) References Cited

U.S. PATENT DOCUMENTS

| | | | | |
|---|---|---|---|---|
| 10,826,933 | B1* | 11/2020 | Ismael | H04L 63/0245 |
| 10,891,382 | B2 | 1/2021 | Bryant et al. | |
| 11,070,573 | B1* | 7/2021 | Edwards | H04L 63/1416 |
| 11,586,727 | B2* | 2/2023 | Tsirkin | G06F 12/1433 |
| 11,601,447 | B1* | 3/2023 | Nelson | H04W 12/128 |
| 11,620,129 | B1* | 4/2023 | Shimony | G06F 9/545 |
| | | | | 726/22 |
| 11,630,919 | B1* | 4/2023 | Tripp | G06F 8/75 |
| | | | | 713/189 |
| 11,704,431 | B2* | 7/2023 | Kraus | H04L 63/0414 |
| | | | | 726/26 |
| 11,783,062 | B2* | 10/2023 | Lounsberry | G06F 21/6218 |
| | | | | 726/30 |
| 11,809,562 | B1* | 11/2023 | Paczkowski | G06F 21/566 |
| 11,861,052 | B1* | 1/2024 | Ivanov | G06N 20/20 |
| 2008/0016339 | A1* | 1/2008 | Shukla | G06F 21/54 |
| | | | | 713/164 |
| 2008/0155274 | A1* | 6/2008 | Martinez | G06F 12/1483 |
| | | | | 713/190 |
| 2009/0282474 | A1* | 11/2009 | Chen | G06F 21/53 |
| | | | | 726/21 |
| 2010/0281543 | A1* | 11/2010 | Golomb | H04L 63/1433 |
| | | | | 726/25 |
| 2010/0333199 | A1* | 12/2010 | Gianoulakis | G06F 21/577 |
| | | | | 726/22 |
| 2011/0145918 | A1* | 6/2011 | Jung | G06F 21/52 |
| | | | | 726/22 |
| 2012/0254995 | A1* | 10/2012 | Sallam | G06F 21/52 |
| | | | | 726/22 |
| 2013/0232573 | A1* | 9/2013 | Saidi | G06F 21/6218 |
| | | | | 726/22 |
| 2013/0239223 | A1* | 9/2013 | Park | G06F 21/554 |
| | | | | 726/26 |
| 2013/0246685 | A1* | 9/2013 | Bhargava | G06F 21/00 |
| | | | | 711/6 |
| 2013/0247186 | A1* | 9/2013 | LeMasters | G06F 21/572 |
| | | | | 726/22 |
| 2013/0340082 | A1* | 12/2013 | Shanley | G06F 21/577 |
| | | | | 726/25 |
| 2014/0090071 | A1* | 3/2014 | Salehie | G06F 21/55 |
| | | | | 726/25 |
| 2014/0208096 | A1* | 7/2014 | Brandwine | G06F 9/45558 |
| | | | | 713/156 |
| 2015/0154415 | A1* | 6/2015 | Wu | G06F 21/6209 |
| | | | | 713/165 |
| 2015/0161383 | A1* | 6/2015 | Chen | G06F 9/44589 |
| | | | | 726/22 |
| 2015/0242626 | A1* | 8/2015 | Wang | G06F 21/577 |
| | | | | 726/23 |
| 2017/0134405 | A1* | 5/2017 | Ahmadzadeh | G06F 21/554 |
| 2017/0140148 | A1* | 5/2017 | Gleeson | G06F 21/125 |
| 2017/0213039 | A1* | 7/2017 | Werner | G06F 12/145 |
| 2017/0300688 | A1* | 10/2017 | Spisak | G06F 9/3806 |
| 2018/0018460 | A1* | 1/2018 | Brown | G06F 21/566 |
| 2018/0025150 | A1* | 1/2018 | Shivanna | G06F 21/6218 |
| | | | | 713/2 |
| 2018/0032731 | A1* | 2/2018 | De | G06F 21/563 |
| 2018/0046802 | A1* | 2/2018 | Pyles | H04W 12/128 |
| 2018/0097829 | A1* | 4/2018 | Muttik | G06F 16/951 |
| 2018/0173685 | A1* | 6/2018 | Christodorescu | G06F 21/577 |
| 2018/0225109 | A1* | 8/2018 | Stewart | G06F 21/51 |
| 2018/0239895 | A1* | 8/2018 | Pearson | G06F 21/64 |
| 2018/0260574 | A1* | 9/2018 | Morello | G06F 9/44505 |
| 2019/0080096 | A1* | 3/2019 | Savry | G06F 21/44 |
| 2019/0132356 | A1* | 5/2019 | Vargas Gonzalez | |
| | | | | H04L 63/1425 |
| 2019/0166142 | A1* | 5/2019 | Lee | H04L 63/1425 |
| 2019/0171846 | A1* | 6/2019 | Conikee | G06F 21/6245 |
| 2019/0188391 | A1* | 6/2019 | Margalit | G06F 21/577 |
| 2019/0243964 | A1* | 8/2019 | Shukla | G06F 21/54 |
| 2019/0243966 | A1* | 8/2019 | Wei | G06F 12/1009 |
| 2019/0243990 | A1* | 8/2019 | Wei | G06F 21/74 |
| 2019/0294537 | A1* | 9/2019 | Bond | G06F 11/3688 |

| | | | | |
|---|---|---|---|---|
| 2019/0318081 | A1* | 10/2019 | Gupta | G06F 8/70 |
| 2019/0318091 | A1* | 10/2019 | Gupta | G06F 21/566 |
| 2019/0340366 | A1* | 11/2019 | Bryant | G06F 21/566 |
| 2019/0349351 | A1* | 11/2019 | Verma | H04L 63/08 |
| 2019/0384918 | A1* | 12/2019 | Ndu | G06F 21/575 |
| 2020/0004993 | A1* | 1/2020 | Volos | G06F 21/73 |
| 2020/0104490 | A1* | 4/2020 | Boulton | G06F 21/563 |
| 2020/0125475 | A1* | 4/2020 | Iyer | G06F 8/75 |
| 2020/0143047 | A1* | 5/2020 | Shivanna | H04L 9/3247 |
| 2020/0192672 | A1* | 6/2020 | Gonion | G06F 9/3844 |
| 2020/0192673 | A1* | 6/2020 | Myers | G06F 9/45558 |
| 2020/0193022 | A1* | 6/2020 | Lunsford | H04L 63/1416 |
| 2020/0287920 | A1* | 9/2020 | Mandrychenko | H04L 67/5651 |
| 2020/0351347 | A1* | 11/2020 | Chang | G06F 9/45558 |
| 2021/0026947 | A1* | 1/2021 | Korotaev | G06F 9/4856 |
| 2021/0026949 | A1* | 1/2021 | Korotaev | G06F 21/554 |
| 2021/0089659 | A1* | 3/2021 | Pardini | G06F 21/85 |
| 2021/0248443 | A1* | 8/2021 | Shu | H04L 63/1416 |
| 2021/0306367 | A1* | 9/2021 | Le | G06F 21/577 |
| 2021/0312037 | A1* | 10/2021 | Revivo | G06F 21/577 |
| 2022/0108013 | A1* | 4/2022 | Favor | G06F 12/1063 |
| 2022/0222370 | A1* | 7/2022 | Bastide | G06F 21/577 |
| 2022/0245043 | A1* | 8/2022 | Jones | G06F 11/3466 |
| 2022/0245539 | A1* | 8/2022 | Clearwater | G06Q 10/0635 |
| 2022/0269789 | A1* | 8/2022 | Norden | G06F 21/554 |
| 2022/0309164 | A1* | 9/2022 | Chiu | G06F 21/577 |
| 2023/0051654 | A1* | 2/2023 | Cha | G06F 11/3688 |
| 2023/0056706 | A1* | 2/2023 | Irving | G06N 3/092 |
| 2023/0081399 | A1* | 3/2023 | Murphy | G06Q 10/06395 |
| | | | | 705/7.42 |
| 2023/0092205 | A1* | 3/2023 | Koteshwara | G06F 21/577 |
| | | | | 726/25 |
| 2023/0098117 | A1* | 3/2023 | Wang | G06F 21/54 |
| | | | | 726/23 |
| 2023/0101945 | A1* | 3/2023 | Walton | G06F 21/78 |
| | | | | 726/26 |
| 2023/0129830 | A1* | 4/2023 | Ghetie | G06F 21/74 |
| | | | | 726/23 |
| 2023/0130206 | A1* | 4/2023 | Joseph | G06F 21/6281 |
| | | | | 726/26 |
| 2023/0153443 | A1* | 5/2023 | Coppins | G06F 21/6245 |
| | | | | 726/25 |
| 2023/0177164 | A1* | 6/2023 | Tamboli | G06F 11/362 |
| | | | | 726/26 |
| 2023/0185903 | A1* | 6/2023 | Li | G06F 21/52 |
| | | | | 726/22 |
| 2023/0214246 | A1* | 7/2023 | Darji | G06F 9/5077 |
| | | | | 718/1 |
| 2023/0252133 | A1* | 8/2023 | Kulshreshtha | G06F 21/552 |
| | | | | 726/22 |
| 2023/0281320 | A1* | 9/2023 | Nasir | G06F 21/577 |
| | | | | 726/1 |
| 2023/0376602 | A1* | 11/2023 | Kasper | G06F 21/577 |
| 2023/0418948 | A1* | 12/2023 | Karpovsky | G06F 21/554 |
| 2024/0104221 | A1* | 3/2024 | Saieva | G06F 11/3698 |
| 2024/0104235 | A1* | 3/2024 | Herzberg | G06F 21/6218 |
| 2024/0160734 | A1* | 5/2024 | Braggs | G06F 21/51 |
| 2024/0193277 | A1* | 6/2024 | Manuel-Devadoss | |
| | | | | G06F 21/577 |
| 2024/0202359 | A1* | 6/2024 | Shukla | G06F 21/6245 |
| 2024/0248995 | A1* | 7/2024 | Gazit | G06F 8/77 |
| 2024/0394380 | A1* | 11/2024 | Zhou | G06F 21/74 |

OTHER PUBLICATIONS

Choi, Jaeseung, et al., "NTFuzzz: Enabling Type-Aware Kernel Fuzzing on Windows with Static Binary Analysis," 2021 IEEE Symposium on Security and Privacy (SP), IEEE, 2021, 16 pages.

Liu, Danjun, et al., ERACE: Toward Facilitating Exploit Generation for Kernel Race Vulnerabilities, Applied Sciences 12.23 (2022): 11925.

Pailoor, Shankara, et al., "MoonShine: Optimizing OS Fuzzer Seed Selection with Trace Distillation," Proceedings of the 27th USENIX Security Symposium, 2018, pp. 729-743.

* cited by examiner

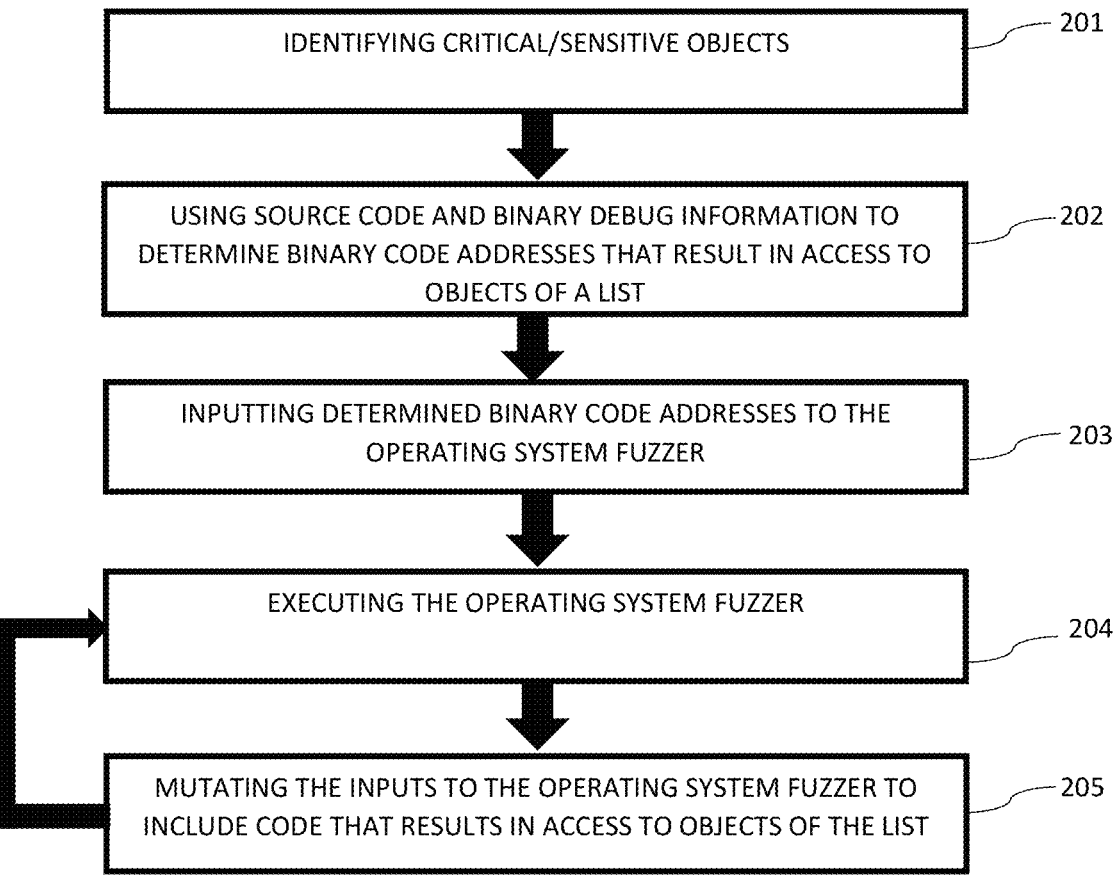

IDENTIFYING CRITICAL/SENSITIVE OBJECTS — 201

USING SOURCE CODE AND BINARY DEBUG INFORMATION TO DETERMINE BINARY CODE ADDRESSES THAT RESULT IN ACCESS TO OBJECTS OF A LIST — 202

INPUTTING DETERMINED BINARY CODE ADDRESSES TO THE OPERATING SYSTEM FUZZER — 203

EXECUTING THE OPERATING SYSTEM FUZZER — 204

MUTATING THE INPUTS TO THE OPERATING SYSTEM FUZZER TO INCLUDE CODE THAT RESULTS IN ACCESS TO OBJECTS OF THE LIST — 205

300

CRITICAL-OBJECT GUIDED OPERATING SYSTEM FUZZING

BACKGROUND

The present invention relates generally to a critical-object guided operating system fuzzing method, and more particularly, but not by way of limitation, to a system, method, and computer program product for guiding an operating system fuzzer to find security-related bugs in a kernel space of the operating system.

"Fuzzing" is a technique used in automated software testing to discover bugs and exploit exploration. Its effectiveness is dependent on its ability to explore the entire code and data space of the target program in a timely manner.

However, there is a technical problem in the art that the operating system (OS) kernel space can be very large and hence exploring it completely can take a very long time.

SUMMARY

In view of the above-mentioned problems in the art, the inventors have considered a technical solution to direct/ guide the fuzzer to find security-related bugs quickly.

Thereby, the invention provides a technical solution to identify critical/sensitive objects in kernel and direct a fuzzer towards code paths that access these objects to discover security-related bugs in software.

In an exemplary embodiment, the present invention can provide a computer-implemented critical-object guided operating system fuzzing method for guiding an operating system fuzzer to find security-related bugs in a kernel space of the operating system, the method including identifying critical/sensitive objects, determining binary code addresses that result in access to the critical/sensitive objects, and executing the operating system fuzzer based on the binary code addresses.

In another exemplary embodiment, the present invention can provide a critical-object guided operating system fuzzing computer program product for guiding an operating system fuzzer to find security-related bugs in a kernel space of the operating system, the critical-object guided operating system fuzzing computer program product including a computer-readable storage medium having program instructions embodied therewith, the program instructions executable by a computer to cause the computer to perform: identifying critical/sensitive objects, determining binary code addresses that result in access to the critical/sensitive objects, and executing the operating system fuzzer based on the binary code addresses.

In another exemplary embodiment, the present invention can provide a critical-object guided operating system fuzzing system for guiding an operating system fuzzer to find security-related bugs in a kernel space of the operating system, the critical-object guided operating system fuzzing system including a processor, and a memory, the memory storing instructions to cause the processor to perform: identifying critical/sensitive objects, determining binary code addresses that result in access to the critical/sensitive objects, and executing the operating system fuzzer based on the binary code addresses.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings.

Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes (and others) of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which:

FIG. 2 exemplarily shows a high-level flow chart for a critical-object guided operating system fuzzing method 100 according to an embodiment of the present invention.

DETAILED DESCRIPTION

Figure 1:
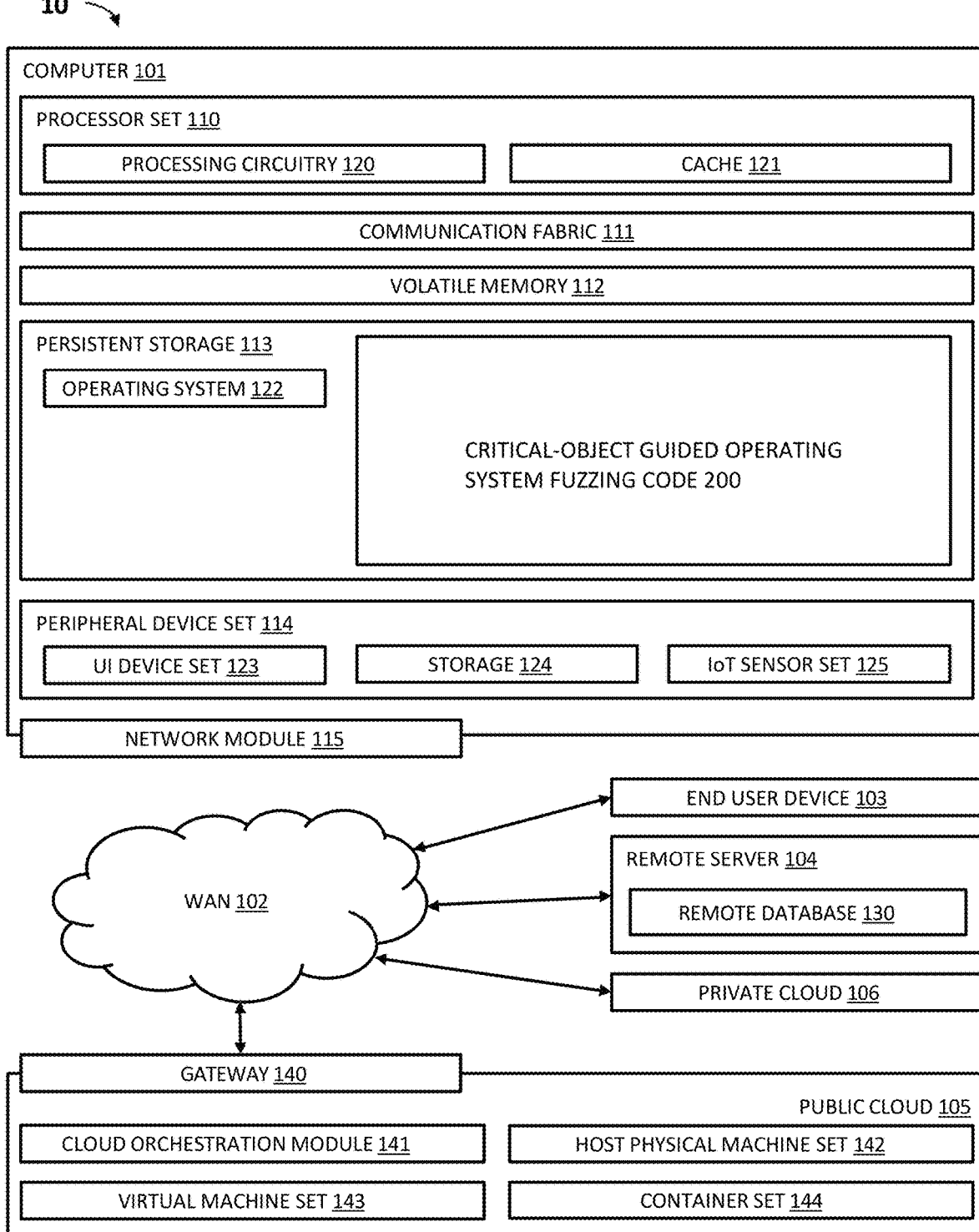
FIG. 1 depicts a computing environment 100 according to an embodiment of the present invention.

The invention will now be described with reference to FIGS. 1-3, in which like reference numerals refer to like parts throughout. It is emphasized that, according to common practice, the various features of the drawing are not necessarily to scale. On the contrary, the dimensions of the various features can be arbitrarily expanded or reduced for clarity.

With reference now to the exemplary method 200 depicted in FIG. 2, the invention includes various steps for a system to guide an operating system (OS) fuzzer towards finding security bugs/vulnerabilities by prioritizing code that access(es) certain critical memory objects such that continued and focused access to those objects will lead to memory corruption/abuse yielding interesting security-related bugs.

The critical-object guided operating system fuzzing method 200 according to an embodiment of the present invention may act in a more sophisticated, useful and cognitive manner, giving the impression of cognitive mental abilities and processes related to knowledge, attention, memory, judgment and evaluation, reasoning, and advanced computation. A system can be said to be "cognitive" if it possesses macro-scale properties-perception, goal-oriented behavior, learning/memory and action—that characterize systems (i.e., humans) generally recognized as cognitive.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

It is noted that an "OS Fuzzer" means a fuzzer, or an automated software testing tool, that is specifically designed to generate inputs to systematically exercise and stress different code paths of an operating system. Its purpose is to discover bugs and/or security vulnerabilities in the OS.

Figure 3:
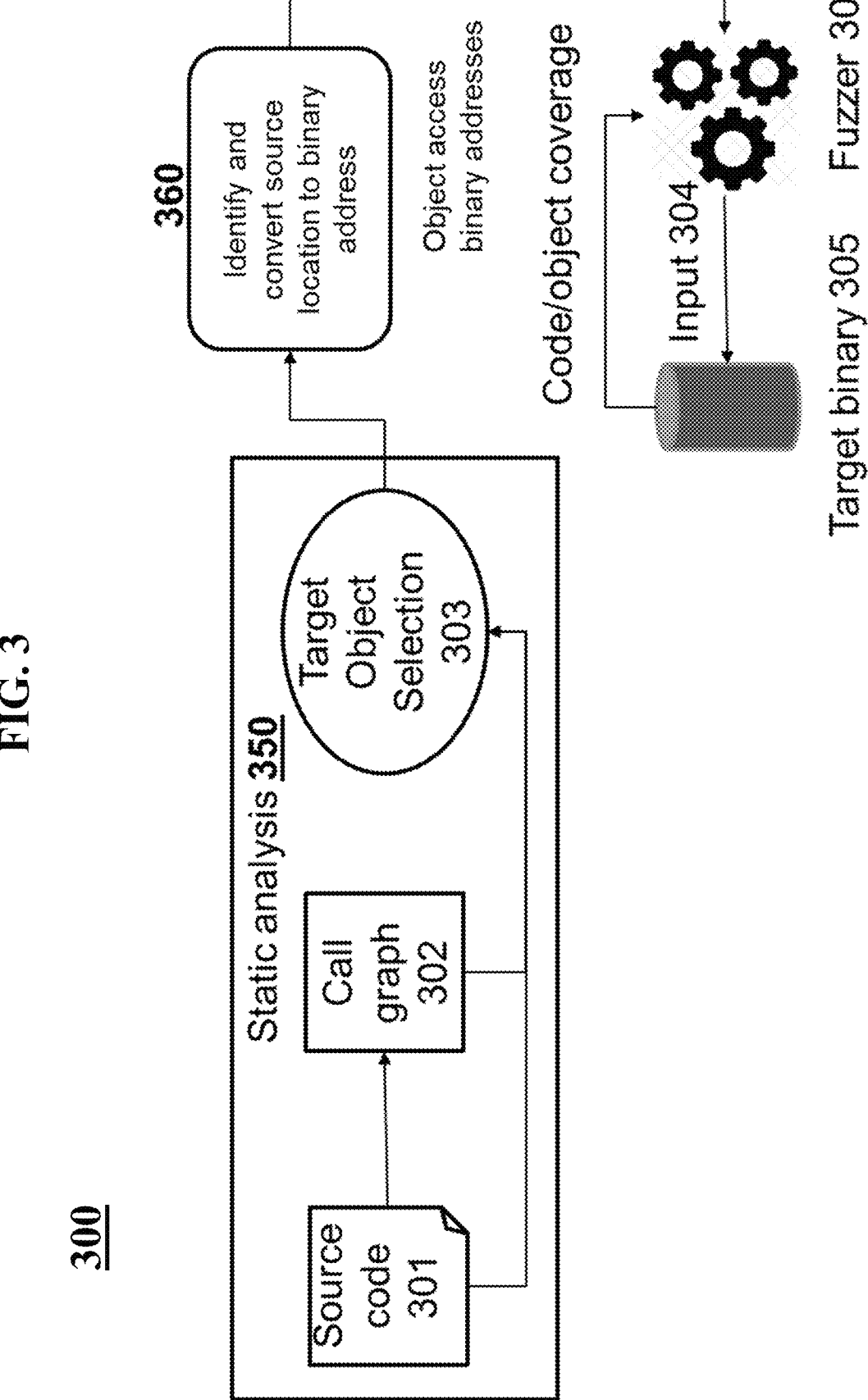
FIG. 3 exemplarily depicts a general architecture 200 according to an embodiment of the present invention.

With reference generally to FIGS. 1-3, method 200 and the architecture 300 thereof can combine scalable static analysis approaches for identifying critical objects with fuzzing to direct an OS fuzzer towards identified critical/high-valued objects that could result in discovering of security-related bugs.

With specific reference to FIG. 2 and, in step 201, critical/sensitive objects are identified from source code 301 (see FIG. 3).

The identifying can include, for example, using static analysis 350 of FIG. 3 to obtain a call graph 302 from kernel entry points. These can be objects that have access types that are write-only and write/read. Alternatively, they can be objects of types that are known to be critical such as elastic object-type or that have been associated with known vulnerabilities in the past.

Static analysis is a technique to analyze software by looking at source code or binary files without having to execute the software. Such static analysis includes, for example, discovering call graphs, control flow graphs, data flow graphs, and/or object relationships.

It is noted that "elastic objects" means objects whose size is determined by a separate length variable.

The identifying of step 201 can further include using a call graph 302 to identify all accessible memory objects and their respective access-types (e.g., read/write, read-only, write-only).

And, the identifying of step 201 can also include generating a list of the critical/sensitive objects (i.e., target object selection 303) from identified accessible memory objects that could create security vulnerabilities if corrupted (e.g., elastic objects, writeable objects, etc.).

In step 202, source code and debug information in the binary are used to determine binary code addresses that result in access to objects of the list (e.g., 360 of FIG. 3).

In step 203, determined binary code addresses are input to the OS fuzzer.

In step 204, the OS fuzzer is executed. Indeed, as shown in FIG. 2, the input 304, target binary 305, and fuzzer 306 are utilized.

In one embodiment, when the OS fuzzer is executed, the OS fuzzer detects when executed basic block contains code to access determined binary code addresses of objects of the list or access target objects and feed that information back into the OS fuzzer.

That is, the OS fuzzer fuzzes the target binary and collects code coverage information (e.g., basic block addresses). The OS fuzzer leverages code coverage information and input binary addresses of target objects to determine if basic block contain instructions that access these objects.

It is noted that "fuzzes" means systematically generating inputs and invoking the target application (e.g., in this case the OS), with those inputs to exercise code in the OS.

And, in step 205, inputs to the OS fuzzer are mutated to include code that results in access to objects of the list.

For example, the inputs are mutated by changing the values of the arguments of one or more system calls and the invocation order of those system calls. Other examples include modifying the content of network packets that are received by the target OS or the interrupt-type that are sent to the OS.

Steps 204-205 are iteratively repeated such that the OS fuzzer uses and mutates inputs that result in executing code blocks with desired access to target objects. The steps are repeated until a bug or vulnerability is discovered, or the code coverage information provided by the OS fuzzer reports no progress or no new code path discovered for a predetermined amount of time.

Thus, the method 200 provides an automated service to harden and test security-related bugs of software being deployed to cloud or customers by identifying critical/sensitive objects through static analysis, combine the criticality of objects to guide an OS fuzzer, and identify the object access coverage information at runtime rather than compilation instrumentation.

Exemplary Aspects, Using a Computing Environment

With reference now to FIG. 1, computing environment 100 contains an example of an environment for the execution of at least some of the computer code involved in performing the inventive methods, such as critical-object guided operating system fuzzing code 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments.

Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented critical-object guided operating system fuzzing method for guiding an operating system fuzzer to find security-related bugs in a kernel space of the operating system, the method comprising:
   identifying critical/sensitive objects;
   determining binary code addresses that result in access to the critical/sensitive objects; and
   executing the operating system fuzzer based on the binary code addresses.

2. The computer-implemented critical-object guided operating system fuzzing method of claim 1, wherein the identifying the critical/sensitive objects includes using a static analysis to obtain a call graph from kernel entry points.

3. The computer-implemented critical-object guided operating system fuzzing method of claim 1, wherein the identifying the critical/sensitive objects includes using a call graph to identify accessible memory objects and their respective access-types.

4. The computer-implemented critical-object guided operating system fuzzing method of claim 1, wherein the identifying the critical/sensitive objects includes generating a list of the critical/sensitive objects from identified accessible memory objects that create a security vulnerability if corrupted.

5. The computer-implemented critical-object guided operating system fuzzing method of claim 1, wherein the identifying the critical/sensitive objects includes:

using a call graph to identify all accessible memory objects and their respective access-types; and generating a list of the critical/sensitive objects from identified accessible memory objects that create a security vulnerability if corrupted.

6. The computer-implemented critical-object guided operating system fuzzing method of claim 5, further comprising mutating inputs to the operating system fuzzer to include code that results in access to the critical/sensitive objects.

7. The computer-implemented critical-object guided operating system fuzzing method of claim 6, wherein the operating system fuzzer detects when an executed basic block contains code to access the binary code address of the critical/sensitive objects.

8. The computer-implemented critical-object guided operating system fuzzing method of claim 5, wherein the operating system fuzzer detects when an executed basic block contains code to access the binary code address of the critical/sensitive objects.

9. The computer-implemented critical-object guided operating system fuzzing method of claim 1, wherein a binary code address of the binary code addresses is determined using source code and binary debug information.

10. The computer-implemented critical-object guided operating system fuzzing method of claim 1, further comprising mutating inputs to the operating system fuzzer to include code that results in access to the critical/sensitive objects.

11. The computer-implemented critical-object guided operating system fuzzing method of claim 1, wherein the operating system fuzzer detects when an executed basic block contains code to access the binary code address of the critical/sensitive objects.

12. The computer-implemented critical-object guided operating system fuzzing method of claim 1, embodied in a cloud-computing environment.

13. A critical-object guided operating system fuzzing computer program product for guiding an operating system fuzzer to find security-related bugs in a kernel space of the operating system, the critical-object guided operating system fuzzing computer program product comprising a computer-readable storage medium having program instructions embodied therewith, the program instructions executable by a computer to cause the computer to perform:

identifying critical/sensitive objects;

determining binary code addresses that result in access to the critical/sensitive objects; and executing the operating system fuzzer based on the binary code addresses.

14. The critical-object guided operating system fuzzing computer program product of claim 13, wherein the identifying the critical/sensitive objects includes using a static analysis to obtain a call graph from kernel entry points.

15. The critical-object guided operating system fuzzing computer program product of claim 13, wherein the identifying the critical/sensitive objects includes using a call graph to identify accessible memory objects and their respective access-types.

16. The critical-object guided operating system fuzzing computer program product of claim 13, wherein the identifying the critical/sensitive objects includes generating a list of the critical/sensitive objects from identified accessible memory objects that create a security vulnerability if corrupted.

17. The critical-object guided operating system fuzzing system of claim 16, embodied in a cloud-computing environment.

18. The critical-object guided operating system fuzzing computer program product of claim 13, wherein the identifying the critical/sensitive objects includes:

using a call graph to identify all accessible memory objects and their respective access types; and generating a list of the critical/sensitive objects from identified accessible memory objects that create a security vulnerability if corrupted.

19. The critical-object guided operating system fuzzing computer program product of claim 13, further comprising mutating inputs to the operating system fuzzer to include code that results in access to the critical/sensitive objects.

20. A critical-object guided operating system fuzzing system for guiding an operating system fuzzer to find security-related bugs in a kernel space of the operating system, said critical-object guided operating system fuzzing system comprising:

a processor; and a memory, the memory storing instructions to cause the processor to perform:

identifying critical/sensitive objects;

determining binary code addresses that result in access to the critical/sensitive objects; and executing the operating system fuzzer based on the binary code addresses.

* * * * *